(12) United States Patent
Fuss

(10) Patent No.: US 6,910,838 B2
(45) Date of Patent: Jun. 28, 2005

(54) ROCK DRILL

(75) Inventor: Mathias Fuss, Leinfelden-Echterdingen (DE)

(73) Assignee: Hawera Probst, GmbH, Ravensburg (DE)

( * ) Notice: Subject to any disclaimer, the term of this patent is extended or adjusted under 35 U.S.C. 154(b) by 334 days.

(21) Appl. No.: 10/220,243

(22) PCT Filed: Feb. 24, 2001

(86) PCT No.: PCT/DE01/00719

§ 371 (c)(1),
(2), (4) Date: Aug. 30, 2002

(87) PCT Pub. No.: WO01/65048

PCT Pub. Date: Sep. 7, 2001

(65) Prior Publication Data

US 2003/0118414 A1 Jun. 26, 2003

(30) Foreign Application Priority Data

Mar. 2, 2000 (DE) ......................... 100 09 732

(51) Int. Cl.⁷ ............................................. B23B 51/02
(52) U.S. Cl. ....................... 408/230; 175/394; 175/415; 175/420.2
(58) Field of Search ................................. 175/385, 389, 175/394, 395, 398, 414, 415, 426, 427, 428, 420.1, 420.2; 408/227, 229, 230

(56) References Cited

U.S. PATENT DOCUMENTS 1,000,067 A * 8/1911 Bennett ...................... 408/224
1,216,628 A * 2/1917 Teasck ....................... 175/395
2,504,601 A * 4/1950 Spry .......................... 175/395
2,673,716 A   3/1954 Avery
5,553,682 A * 9/1996 Batliner et al. ............. 175/395
5,836,410 A * 11/1998 Kleine ........................ 175/415
6,129,162 A * 10/2000 Hauptmann ................. 175/394
2001/0013430 A1 * 8/2001 Hauptmann et al. ........ 175/415

FOREIGN PATENT DOCUMENTS

| DE | 1958079 | | 3/1967 |
|----|---------|----|--------|
| DE | 2912394 | A1 | 10/1980 |
| DE | 3014693 | C2 | 10/1981 |
| DE | 3102053 | A1 | 2/1982 |
| DE | 4012772 | A1 | 10/1991 |
| DE | 4339245 | A1 | 5/1995 |
| DE | 4407119 | A1 | 6/1995 |
| DE | 4419641 | A1 | 12/1995 |
| DE | 19734094 | A1 | 5/1998 |
| DE | 19707115 | A1 | 8/1998 |
| DE | 19709771 | A1 | 9/1998 |
| DE | 19724373 | A1 | 12/1998 |
| DE | 19753731 | A1 | 6/1999 |
| DE | 19915303 | A1 | 10/1999 |
| DE | 19859885 | A1 | 11/1999 |
| EP | 0361189 | * | 9/1989 |
| EP | 0657617 | A1 | 6/1995 |
| FR | 2779366 | A1 | 12/1999 |

* cited by examiner

Primary Examiner—Daniel W. Howell
(74) Attorney, Agent, or Firm—Venable LLP; Robert Kinberg

(57) ABSTRACT

A rock drill for rotary hammers is proposed in which a conveying helix (3) having main and secondary webs (6 to 9) is used. A one-piece carbide crown, with its wing-shaped main and secondary lips (24 to 27), is butt-welded to the conveying helix.

14 Claims, 1 Drawing Sheet

ROCK DRILL

BACKGROUND OF THE INVENTION

1. Field of the Invention

The invention relates to a rock drill for hand-guarded rotary hammers, percussion drilling machines, rotary machines and the like.

The invention relates to a rock drill according to the preamble of claim 1.

2. Related Art

Conventional rock drills consist of a drill shank and a drill head in which a carbide cutting element, roof-shaped in side view and extending over the entire drill nominal diameter, is inserted (see, for example, DE 29 12 394 A1). In addition to this "main cutting tip", secondary cutting tips, likewise arranged in a roof shape, may also be arranged, and these secondary cutting tips may be arranged, for example, in a cross shape, that is to say while including a right angle, or also in an x-shape (for example EP 0 657 617 A1). The drill head has axially running slot-shaped recesses in which such cutting tips are inserted and brazed in place.

In order to achieve adequate endurance of the carbide tips, they must have a certain minimum thickness, a factor which necessitates a correspondingly wide locating slot for the carbide tips. However, such a locating slot extending over the entire diameter, and possibly transversely thereto, for such a carbide cutting tip having main and secondary lips reduces the available wall thickness for supporting the respective main and/or secondary lips, which is of importance in particular in drilling tools having a smaller nominal diameter, for example less than 10 mm. This applies in particular when the drill head is of very slim design for forming large flute cross sections for drillings to be removed (see, for example, DE 197 34 094, FIGS. 4 and 7).

In multi-start conveying helices, the drillings transport from the drill head into the conveying helix flutes is effected by appropriate recesses in the drill head. The recesses also weaken the drill head with regard to the support of the carbide cutting tips used.

DE 197 53 731 A1 has disclosed a rock drilling tool in which, in order to improve the conveying properties, main and secondary conveying helices are formed, so that, in a two-start conveying helix for example, a type of four start conveying helix is produced by the secondary conveying web present in each case. A transversely inserted, roof-shaped carbide cutting tip results in each case in two main conveying flutes which are subdivided into a plurality of secondary conveying flutes by the secondary webs. With one secondary conveying helix in one main conveying flute, two secondary conveying flutes are therefore formed, that is to say a total of four secondary conveying flutes in the case of a two-start conveying helix (see, for example, FIGS. 1 and 2 of DE 197 53 731 A1).

The access to each secondary conveying flute is achieved by an extremely thin drill head, which is achieved by a straight, axially parallel runout of the conveying helix in the region of the drill head.

Drilling tools and in particular rock drills which have a drill head made entirely of carbide have been disclosed, the drill head being provided with intimated drillings flutes which lead to the individual drillings flutes in the conveying helix (DE 43 39 245 A1). Used in a further tool in this respect according to DE 197 09 771 A1 is, for example, a cross-shaped carbide drilling head which has main and secondary lips, the diameter over the secondary lips being slightly smaller than the nominal diameter of the drill. In this rock drill, the one-piece drill head of carbide can be attached with an essentially flat connecting surface to a drill core (not shown in any more detail) by means of a brazed or welded joint. In this way, four drillings disposal flutes are formed.

Finally, DE 197 07 115 A1 shows a rock drill in which a star-shaped carbide insert formed in one piece is embedded in corresponding axially [sic] longitudinal grooves in the drill head. The use of only three lips in the exemplary embodiment of this publication permits three disposal flutes, but with corresponding weakening of the drill head at the supporting embedding of the carbide insert.

OBJECTS OF THE INVENTION

An object of the invention is to produce an optimized rock drill which in particular has high endurance with low friction, losses and optimum conveying properties.

SUMMARY OF THE INVENTION

The above and other objects are achieved according to an embodiment of a rock drill of the present invention which is set forth herein by way of example only. Exemplary modifications are additionally described herein.

The invention is based on the knowledge that optimum drilling properties can only be achieved when conveying helix and drill head are adapted to one another according to the invention. For this purpose, the conveying helix must have good conveying properties, which is achieved by a large conveying volume of the conveying flutes. However, a large conveying volume of the disposal flutes generally results in a small core cross section, which leads to weakening of the drilling tool, in particular in the region of the drill head. This applies in particular when the drill head has one or more longitudinal slots for accommodating carbide cutting tips.

To achieve optimum conveying properties, the present invention uses a rock drilling tool as disclosed by DE 197 53 734 A1 of the applicant. As already described above, a high conveying capacity is formed in the case of such a drilling tool by means of a large conveying volume in large drillings flutes, in which, however, secondary conveying helices are incorporated for assisting the conveyance of drillings and for strengthening the drill shank. The conveying helix consequently consists of main and secondary conveying helices which have optimum conveying properties.

In order to also optimize such a drilling tool in the drill head, a one-piece carbide drill head or carbide crown is attached, the geometry of which, with regard to the main lips and secondary lips, is designed in such a way that, to a very large extent, a smooth transition is produced at the cross-sectional geometries of the main and secondary webs of the drill conveying helix in the transition region to the drill head. As a result, no weakening of the drill head occurs due to longitudinal slots to be made for the main and/or secondary cutting tips, so that, in addition to a robust drill head, optimum conveying properties are also ensured.

Especially advantageous is the development of the invention to the effect that, as an alternative to a cross-shaped carbide crown, an X-shaped carbide crown may also be used, to be precise depending on the geometrical adaptation of the main and secondary lips of the drill head to the main and secondary webs of the conveying helix. The transition of the drillings flutes from the conveying helix into the drill head is thus effected virtually without any hindrance; that is to say that the drillings are removed from the drill head into the conveying helix without constrictions disturbing the drillings flow in the region of the drill head. In addition, a high degree of guidance properties of the drill head is ensured in particular during the spot drilling operation.

Furthermore, it is advantageous that the drill head has a carbide crown with an additional centering point. As a result, the spot-drilling operation can be improved. One or more centering lips may also be provided.

In an exemplary embodiment, the conveying helix of the rock drill is of two-start design, having in each case two helically encircling main webs and two secondary webs lying in between in each case. As a result, a cross-shaped carbide crown or also an X-shaped carbide crown can be used for forming main conveying flutes and secondary conveying flutes.

A further development of the invention lies in the fact that the outside diameter of the secondary lips of the carbide crown is as far as possible equal to or only slightly larger than the outside diameter of the secondary conveying helix or secondary webs of the conveying helix, whereas the outside diameter of the main carbide lip of the carbide crown, this outside diameter forming the nominal diameter of the drilling tool, is adapted to the outside diameter of the main webs of the conveying helix. In this case, the outside diameter of the secondary webs and thus of the secondary lips is about 0.5 to 0.9 times and preferably 0.7 to 0.8 times the outside diameter of the main webs or the main lip.

Furthermore, it is advantageous that the land widths of the main webs are approximately the same as the thickness of the main lip of the carbide crown.

Provision is made according to the invention for the conveying edges of the main and/or secondary webs, for forming bearing surfaces for drillings, to preferably run approximately at right angles to the drill longitudinal axis.

In an advantageous development of the invention, the secondary web of the secondary conveying helix is designed with a land which tapers to a point and in each case leads to the conveying side of the secondary lip of the carbide crown. Other cross sectional forms may also be used for the secondary conveying helix. Reference is made in this respect in particular to DE 197 53 731 A1.

Further details and advantages follow from the description of the exemplary embodiment below.

BRIEF DESCRIPTION OF THE DRAWINGS

The invention is explained in the following with the aid of the drawings which showing an exemplary embodiment and without restricting the general inventive idea.

DETAILED DESCRIPTION OF THE INVENTION

Figure 1:
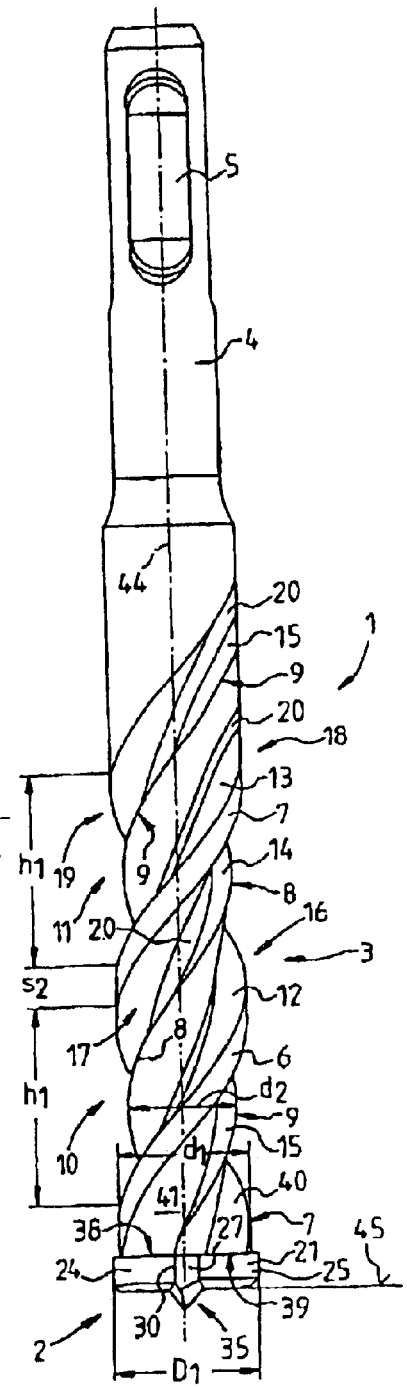
FIG. 1 shows a side view of a drilling tool according to the invention.

The rock drill 1 shown in FIG. 1 in side view consists of a drill head 2, a helical shank adjoining this drill head and having a two-start conveying helix 3, and a clamping shank 4 adjoining this helical shank and intended for inserting into a drive machine. The clamping shank 4 has locating means 5 for inserting into a rotary hammer (SDS-plus shank).

Identical or corresponding parts are given the same reference numerals in the drawings and may not be introduced again.

Figure 2:
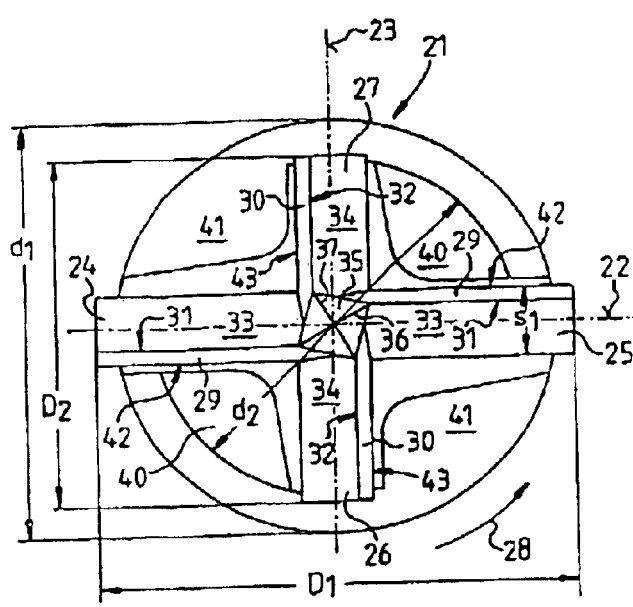
FIG. 2 shows a plan view of the drilling tool in an enlarged representation.

In its construction, the helical shank or conveying helix 3 is in principle designed in the same way as described in the publication DE 197 53 731 A1 of the applicant and in particular in FIGS. 1 and 2 there. Reference is hereby expressly made thereto. In this case, in the present exemplary embodiment, the conveying helix 3 is designed as a two-start conveying helix, in each case a main disposal flute 10, 11 being formed over a height section $h_1$ between two helically encircling main webs 6, 7. These height sections $h_1$ are only shown symbolically in FIG. 1 in order to show the region of these main disposal flutes 10, 11. The main webs 6, 7 of the conveying helix 3 have an outside diameter $d_1$ and also have, for example, a rectangular or semi-trapezoidal cross section with conveying edges 12, 13 lying perpendicularly to the drill longitudinal axis 44.

Located within each main disposal flute 10, 11 having the main webs 6, 7 defining them is in each case an encircling secondary web 8, 9 having a smaller outside diameter $d_2$. The secondary web 8, 9 is formed as a projection relative to the main disposal flute 10, 11. The main web 6 therefore forms a lateral, approximately radially running conveying edge 12 for drillings to be conveyed, and the main web 7 forms a corresponding conveying edge 13 for corresponding drillings. Equally, the secondary web 8 has a conveying edge 14 for drillings, and the secondary web 9 has a corresponding conveying edge 15 for corresponding drillings. It follows from this that the main disposal flute 10 is divided into two disposal flutes 16, 17 having he conveying edges 12, 14, and the further main disposal flute 11 is divided into two further disposal flutes 18, 19 having the conveying edges 13, 15. The conveying helix is therefore a two-start conveying helix 3 having the main webs 6,7 with in each case secondary web 8, 9 embedded in the drillings disposal flute. In addition to the conveying edges 12 to 15, which to a very large extent run radially, the conveying helix 3 has axially parallel sections in the flute root, which are indicated by reference numeral 20.

The width of the main webs 6, 7 is $s_1$ (see FIG. 2), and the secondary webs 8, 9 are designed in such a way that they taper virtually to a point at their outer periphery. The diameter ratio $d_1$ to $d_2$ is approximately $d_2 \approx 0.7$ to $0.9 \times d_1$.

Apart from that, reference is expressly made to D 197 53 731 A1 for explaining the construction of the helical shank 3. Such a helix is produced by a machining process for example.

The rock drill according to FIG. 1 has a one-piece carbide crown 21, as shown in FIG. 1 in side view and in FIG. 2 in a plan view of the drilling tool.

The carbide crown 21 is designed as a carbide cross; that is to say that the vertical longitudinal symmetry planes 22, 23 are at right angles to one another. The carbide cross 21 has two main lips 24, 25 lying on the vertical longitudinal plane 22 and two secondary lips 26, 27 lying on the vertical longitudinal symmetry plane 23. The main and secondary lips 24 to 27 have front rake faces 29 and 30, respectively, which point in the direction of rotation (arrow 28) of the drilling tool. Flank sections 33, 34 are located behind the respective cutting edge 31, 32.

A nominal diameter $D_1$ is formed by the length, shown in plan view in FIG. 2, of the two main lips 24, 25. A diameter $D_2$ of the two secondary lips 26, 27 is obtained from the representation in FIG. 2 in their longitudinal extent.

The diameter $D_1$ of the main lips 24, 25 is slightly larger than the outside diameter $d_1$ of the main webs 6, 7. Likewise, the diameter $D_2$ is the same size as or only slightly larger than the outside diameter $d_2$ of the secondary webs 8, 9. In this case, the ratio of $D_2$ to $D_1$ may be approximately $D_2 \approx 0.7$ to $0.9 \times D_1$.

In its center, the carbide cross 21 has an additional, pyramidal centering point 35. As can be seen from FIG. 2, the first symmetry plane 36 in this case connects the cutting edges 31 of the two main lips 24, 25, and the second symmetry plane 37 connects the two cutting edges 32 of the two secondary lips 26, 27.

By means of a suitable joining process, such as, for example, a resistance welding process, diffusion welding process or brazing process, the carbide crown 21 is butt-welded with its flat bottom surface 38 Onto an appropriately prepared top flat surface 39 of the helical shank 3, the main lip 24 being in alignment with the main web 6 and the main lip 25 being in alignment with the main web 7. For this purpose, the thickness $s_1$ of the main lips 24, 25 is designed to be approximately the same as the land width $s_2$ of the main webs 6, 7. Lateral front flanks 42 of the main lips 24, 25 merge into the conveying edges 12, 13 of the conveying helix. Likewise, front flanks 43 of the two secondary lips 26,27 are in alignment with the conveying edges 14, 15 of the secondary webs 8, 9.

The carbide crown 21, at its connecting surface 38, may have additional centering means or fastening means such as pins or webs or the like.

The invention ensures that the material removed by the rake faces 29, 30 of the carbide crown 21 passes directly into the disposal flute 40, 41 lying in front of it. The butt-welded carbide crown 21 thus results in extremely large drillings disposal flutes in front of the respective cutting edges 31, 32 of the main and secondary lips 24, 25 and 26, 27, respectively. This results in optimum conveying properties As can be seen by way of example from FIGS. 1 and 2, the cutting edges 31, 32 are arranged in a plane 45 on which a drill longitudinal axis 44 is disposed perpendicularly.

The invention is not restricted to the exemplary embodiment shown and described. On the contrary, it also comprises all modifications and developments within the scope of the patent claims. For example, instead of being designed in a cross shape, the carbide crown may also be designed in an X-shape, an obtuse angle preferably being set between the leading main lips 24, 25 of the trailing secondary lips 26, 27. Furthermore, the diameter ratio of the diameters $d_1$ to $d_2$ of the main and the secondary web may also vary.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

LIST OF DESIGNATIONS

1 Rock drill
2 Drill head
3 Helical shank with 2-start conveying helix
4 Clamping shank
5 Locating means
6 Main web
7 Main web
8 Secondary web
9 Secondary web
10 Main disposal flute
11 Main disposal flute
12 Conveying edge
13 Conveying edge
14 Conveying edge
15 Conveying edge
16 Disposal flute
17 Disposal flute
18 Disposal flute
19 Disposal flute
20 Axially parallel sections
21 Carbide crown
22, 23 Longitudinal symmetry plane
24, 25 Main lip
26, 27 Secondary lip
29, 30 Front rake face
31, 32 Cutting edge
33, 34 Flank section
35 Centering point
36, 37 Symmetry plane
38 Surface
39 Surface
40, 41 Disposal flute
42, 43 Flank
44 Drill longitudinal axis
45 Plane

What is claimed is:

1. A rock drill having a longitudinal axis, the rock drill comprising:
   a drill head formed from a one-piece carbide crown, the drill head having
      main lips having a first outside lip diameter formed by a longitudinal extent of the main lips, and
      secondary lips having a second outside lip diameter formed by a longitudinal extent of the secondary lips and being set back relative to the first outside lip diameter; and
   one of a single- and multi-state conveying helix having
      helically encircling main webs having a first outside web diameter that is equal to or slightly smaller than the first outside lip diameter, and
      helically encircling secondary webs having a second outside web diameter,
         the main and secondary webs having conveying edges in disposal flutes for transporting drillings,
      the conveying helix being connected to the drill head by one of a welded or brazed joint in such a manner that the main webs are connected to the main lips and the secondary webs are connected to the secondary lips.

2. The rock drill according to claim 1, wherein the conveying edges of the main and secondary disposal flutes run out into lateral front flanks of the main and secondary lips of the carbide crown drill head.

3. The rock drill according to claim 1, wherein the first and second outside lip diameters are one of the same size as and slightly larger than the first and second outside web diameters, respectively.

4. The rock drill according to claim 1, wherein the main and secondary lips form one of a cross shape and X-shape in plan view.

5. The rock drill according to claim 1, wherein the carbide crown of the drill head has one of a centering point and at least one or more centering lips.

6. The rock drill according to claim 1, wherein the conveying helix is of a two-start design, having two helically encircling main webs and two secondary webs lying in between in each case.

7. The rock drill according to claim 1, wherein the first outside lip diameter is larger than the second outside lip diameter, and the second outside lip diameter is approximately 0.5 to 0.9× the first outside lip diameter.

8. The rock drill according to claim 1, wherein a thickness of the main lips is one of approximately the same width as, slightly wider than and slightly narrower than a land width of the main webs.

9. The rock drill according to claim 1, wherein the secondary webs have a land tapering to a point.

10. The rock drill according to claim 1, wherein the secondary webs have a land tapering to one of a point, a flat end, and a round end, and the secondary webs have a prominence relative to a flute root, the prominence being one of rectangular, trapezoidal, semi-trapezoidal, triangular, crowned, and hemispherical in cross section.

11. The rock drill according to claim 1, wherein, to form bearing surfaces for drillings, the conveying edges of at least one of the main webs and secondary webs run approximately at right angles to the drill longitudinal axis.

12. The rock drill according to claim 1, wherein the carbide crown of the drill head has a connecting surface that is substantially flat and has at least one of centering and positioning aids.

13. The rock drill according to claim 1, wherein the main and secondary lips have cutting edges arranged in a plane lying perpendicularly to the drill longitudinal axis.

14. The rock drill according to claim 7, wherein the second outside lip diameter is 0.7 to 0.8× the first outside lip diameter.

* * * * *